3,047,463
PREPARATION OF NON-HYGROSCOPIC GRANULES OF POWDERED VALERIAN EXTRACT, EXTRACTS OF HOPS, AND POWDERED DRY MILK
Hans Merkel, Ruthmanninstrasse 5, Nurtingen, Germany
No Drawing. Filed June 10, 1959, Ser. No. 819,215
Claims priority, application Germany June 16, 1958
7 Claims. (Cl. 167—65)

This invention relates to the preparation of granulated particles from extracts of valerian and hops and it has particular relation to the preparation of such particles which are free from coatings, easily soluble and non-hydroscopic.

Water-soluble, pure dry pulverulent extracts of the valerian root and of hops, and also of various other drugs, have the undesirable property of being strongly hydroscopic. For example a dry pulverulent extract of valerian root becomes damp within ½ hour, when exposed in an open container to atmospheric air of 50% relative humidity and it shows a tendency of cake formation and changing to a homogeneous, viscous smear subsequently. Dry, pulverulent hop extracts become likewise damp and sticky when exposed to the atmospheric air for an hour, under similar conditions. Mixtures of said two pulverulent extracts behave similarly.

Attempts to reduce hydroscopicity of said extracts by granulation with organic solvents have been found to be completely negative in two directions. On the one hand, the pulverulent mass formed a large proportion of undesirable compact lumps of considerable size, whereby this proportion was higher than that of the non-uniform granulated product obtained. On the other hand, after only a few hours the granulated product exhibited the same strongly hydroscopic characteristics as the powder proper. Mixing of the dry pulverulent extracts of valerian root or hops, respectively, with milk sugar, grape sugar or talcum—even in the use of these materials in great excess—could not prevent hydroscopicity, but only delay it slightly. Upon attempting granulation of such mixtures with organic solvents, granulated products were obtained which—although only after a longer period of standing—likewise became damp and showed the tendency of sticking together so that, like the powder proper, they could be stored only in hermetically sealed containers. In practical use, the necessity of hermetically closing the container, each time after it was opened, is a considerable disadvantage. Therefore, granules obtained by comminution of tablets, which contain extracts of hops and valerian, were provided with coatings of shellac, gelatin and the like in order to prevent sticking together of the individual particles. However, the products thus obtained are difficultly soluble in fluids and do not yield clear solutions and, therefore, they can be administered per os only in mixture with solid food, e.g. mashed potatoes, cream of wheat, or the like.

It has now been unexpectedly found that dry milk powder, particularly skim milk powder, or whole milk powder, admixed to pulverulent extracts of valerian and/or hops, already in slight excess, have the capacity of yielding non-hydroscopic granules, if volatile organic solvents, such as lower alcohols, ketones, ether, and the like are used as auxiliary granulating fluids and that the granules thus obtained show no noticeable hydroscopicity even at relatively high humidity of atmospheric air and upon extended exposure to the air, in complete contrast to the ordinary mixtures obtained by mere mixing of powdered extracts of valerian or hops with dry milk products, without any additional manipulation. While, for example, a mixture of one part of powdered valerian extract and three parts of milk powder becomes damp and shows a tendency of caking when exposed to air for three hours, granules prepared from this mixture according to the present invention by granulation with the conventional amount of ethyl alcohol of 96% have been found to be stable for an unlimited period of time in air of 50% relative humidity. By mixing one part of valerian extract powder or one part hops extract powder with only 2 parts of skim milk powder and forming the mixture to granules in the above described manner, the resulting granules were found to be of unlimited stability with regard to hydroscopicity, when exposed to air of 50% humidity.

Surprisingly, it has been further found that for the preparation of non-hydroscopic granules, not the completely anhydrous organic solvents, but volatile solvents containing a certain proportion of water, preferably up to about 10% of water, are particularly well suitable as the granulating fluid. This fact is particularly surprising, because it could have been expected that in the preparation of non-hydroscopic granules any presence of water should be avoided.

Granulation of the powdered extracts of valerian and/or hops according to the invention can be carried out with most volatile organic solvents. However, the lower alcohols, such as ethyl alcohol, isopropyl alcohol and the like, have been found to have the best effect with regard to the yield and also with regard to the stability of the granules, particularly if these alcohols are used with a relatively low water content, e.g. up to 10%.

In addition to the non-hydroscopic character of the granules obtained according to the present invention, they have the advantage of being quickly and completely soluble in water and aqueous liquids.

It has been further found that this advantage, as well as the strength of the granules, the yield obtainable in preparing the granules and the specific gravity too, can be further increased according to a specific embodiment of the present invention by incorporation of non-hydroscopic, water-soluble salts of weakly alkaline reaction in the powdered mixture used for granulation. Any weakly alkaline salt which is harmless to the living organism, and capable of binding acids can be used, provided that the respective salt is soluble in water to a clear solution. In the use of dry milk which is free from fat, e.g. skim milk, the incorporation of sodium tripolyphosphate ($Na_5P_3O_{10}$) has been found to be particularly advantageous, due to its complex binding capacity relative to ions of calcium and magnesium, in order to obtain clear solutions showing no turbidity when mixed with clear liquids, such as water, coffee, tea and the like. This could not be expected, because, due to its emulsified character, skim milk, by itself, yields non-transparent solutions. In the granules obtained from valerian and hops extracts according to the present invention, the skim milk free from fat forms with sodium tripolyphosphate a complex compound which is clearly soluble even in hard water. Such products of the invention which contain sodium phosphates of the abovementioned type, dissolve particularly quickly and easily so that the use of the phosphate admixture results in preparations of excellent quality. The addition of the polyphosphate in the usual amounts of 10–40%, changes the pH value of an aqueous solution only slightly, and this is due to the buffering action of the skim milk.

The following examples describe by way of example some specific embodiments of and best modes for carrying out the invention, to which the invention is not limited.

*Example 1*

50 parts of powdered valerian extract
50 parts of powdered hops extract 100 parts of powdered skim milk, and
100 parts of powdered whole milk are thoroughly mixed with each other. The powder thus obtained is hygroscopic and becomes damp and sticky upon standing in atmospheric air of 50% relative humidity, for 2½ hours. If, however, the powder is granulated in conventional manner with the use of 150 parts of isopropyl alcohol containing 6% of water, upon drying at 100° C. granules are obtained which are substantially non-hygroscopic and are practically of unlimited stability when exposed to atmospheric air. The granules are easily soluble in water. The pH value of a 2% solution amounts to about 6.4.

*Example 2*

40 parts of powdered valerian extract
10 parts of powdered hops extract
100 parts of powdered skim milk, and
50 parts of sodium tripolyphosphate powder are thoroughly mixed in dry condition. The mixture thus obtained is thoroughly kneaded with 100 parts of 92% ethyl alcohol (containing 8 parts of water), whereby a mass which can be satisfactorily granulated is obtained. The granules thus obtained are dried at a temperature up to 100° C. until the liquid is completely evaporated.

The granules which are obtained in high yield and have an average grain size of 1–2 mm. are stable under normal conditions of atmospheric air and humidity. A teaspoonful of the granules dissolves extremely easily and without residue in about 40 seconds in a cup of warm fluid e.g. tea or coffee, to a clear solution. A 2% aqueous solution of the granules has a pH value of 7.4. The specific gravity of the granules remains substantially below 0.6 even if the proportions of components are varied and this has a favorable effect on the quick solubility.

*Example 3*

80 parts of powdered valerian extract
20 parts of powdered hops extract
220 parts of powdered skim milk, and
180 parts of polyphosphate ($Na_5P_3O_{10}$)

are mixed to a homogeneous product and subjected to granulation with 250 parts of isopropyl alcohol of 96%. The granules thus obtained show hygroscopic characteristics even in an atmosphere of 65% of relative humidity. A teaspoonful of the granules dissolves in a cup of hot coffee to a clear solution without residue in about 50 seconds.

Unexpectedly, it has been also found that the compositions embodying the present invention have the effect of reducing or eliminating undesirable effects of coffee and tea when consumed by persons having a weak stomach. It has been found that by adding to one cup of coffee, granules produced in accordance with any of the above examples in an amount of about 0.3 gram, the caffeic acids, or other acid stimulants, are apparently bound by the preparation according to the present invention to the neutral point. Moreover the stimulating effect of the caffeine on the nervous system is reduced by the action of substances present in the valerian or hop extract, respectively. But the delicate aroma and rich flavor as well as a moderate stimulating effect of the coffee or tea respectively, are thereby not affected.

The products of the present invention can be used as additions to coffee and tea, and for the preparation of aqueous valerian solutions or of aqueous extracts, suitable for obtaining the conventional therapeutic effects of these ingredients and the hops extract can also be used as additive in beer brewery.

The parts mentioned herein are by weight if not otherwise stated.

The average size of granules embodying this invention is in the range of from about 0.5 mm. to about 3 mm.

The individual ingredients can be used in the following ranges:

Powdered valerian extract _____ Ca. 10% to 35%.
Powdered hops extract _____ Ca. 10% to 35%.
Powdered dry milk _____ Ca. 30% to 70%.
Alkaline reacting salt _____ Ca. 10% to 50%.

Although in the preceding examples the production of non-hygroscopic easily soluble granulated particles has been described in which mixtures of extracts of valerian and hops have been used, the process according to the invention may also be used in connection with only one of the individual pulverulent extracts in order to obtain non-hygroscopic extracts of valerian or hops, respectively.

*Example 4*

20 parts of powdered valerian extract
40 parts of powdered skim milk, and
40 parts of powdered sodium tripolyphosphate are granulated with 50 parts of isopropyl alcohol+4 parts of water and dried at 100° C. The granules obtained after sifting are stable for an unlimited period of time under normal climatic conditions and are soluble in water, coffee and tea to a clear solution.

*Example 5*

30 parts of powdered hops extract
60 parts of powdered skim milk, and
40 parts of powdered sodium tripolyphosphate are granulated with 70 parts of ethyl alcohol (in a concentration of 96 percent)+5 parts of water and are dried at 100° C. The granules obtained after sifting are stable for an unlimited period of time under normal conditions and are soluble in water, coffee or tea to a clear solution.

In order to obtain products dissolving to a clear solution, instead of sodium tripolyphosphate, other weakly alkaline salts such as disodium phosphate ($Na_2HPO_4$) or sodium pyrophosphate ($Na_4P_2O_7$), may be used. Also, the phosphate salt may, either in part or wholly, be substituted by sodium bicarbonate. However, if sodium bicarbonate per se is used, a preparation is obtained which does not dissolve in water, or any other liquid such as coffee or tea, to a clear solution. The faintly alkaline phosphate salts seem to be particularly suited for the reason that they form complex compounds with the powdered milk and extract compounds.

In the examples an aqueous alcohol has been used as the granulating liquid. Those skilled in the art will realize that instead of this alcohol, aqueous aceton or aqueous diethyl ether or ethylacetate may be used. For carrying out the process it is only essential that the inert solvent is volatile and capable of mixing with the amount of water required for carrying out the process of producing the non-hygroscopic preparations.

The granulating process used in the production of the novel non-hygroscopic preparations corresponds to the known processes for the production of granules. The individual components are, for example, thoroughly mixed with one another in dry condition, are subsequently mixed with the calculated amount of liquid, and are subsequently thoroughly mixed for another time. In a granulating machine of the conventional type the material is pressed through a number of sieves. The threads of the material pressed through these sieves, which threads have a thickness of, for example, between 1 and 2 mm., are placed on a dryer in crumbled condition. Subsequently, depending on the kind of solvent used, drying is effected at temperatures between 10° and 20° above the boiling point of the solvent used. Subsequently, the granulated material thus obtained is passed through a sieve in order to remove the smaller or larger, respectively, particles.

The extracts used in the production of the preparations are extracts of valerian and of hops which have been obtained in the conventional manner and which are available in trade. The powdered valerian extract, for example, is obtained by extracting the valerian root with vapor, evaporating the aqueous extract and drying it to powder in a spraying procedure. The hops extract may have been obtained by extracting the dried oil bags of the hops with alcohol, evaporating the alcohol in the usual manner and working up the residue to powder.

What is claimed is:

1. A process for preparing non-hygroscopic, easily soluble granules containing a powdered extract selected from the group consisting of valerian extract, extracts of hops and mixtures thereof, comprising mixing said powdered extract with a proportionate excess over the extract of powdered dry milk selected from the group consisting of dry skim milk and dry whole milk and subjecting the resulting mixture to granulation with an organic solvent containing up to 10% of water and drying the granules thus formed.

2. A process according to claim 1, the proportionate excess of powdered dry milk being at least two.

3. A process as claimed in claim 1, in which the organic solvent is a lower aliphatic alcohol.

4. A process as claimed in claim 1, in which a water-soluble, non-hygroscopic, weakly alkaline reacting salt is incorporated in the granules.

5. A process as claimed in claim 4, in which the salt is a polyphosphate and said salt is incorporated into the mixture of powdered extract and powdered dry milk.

6. A process as claimed in claim 4, comprising mixing 40 parts of powdered valerian extract, 10 parts of powdered hops extract, 100 parts of skim milk powder and 50 parts of sodium tripolyphosphate powder to a substantially uniform mixture, granulating said mixture with 100 parts ethyl alcohol of 92% and drying the granulated mixture.

7. A granulated, non-hygroscopic composition, the essential ingredients of which consist of a mixture of valerian extract and hops extract with dry milk and with sodium tripolyphosphate, said mixture containing a proportionate excess of the dry milk over the extracts and being granulated with a volatile organic solvent containing up to 10% of water and being freed from volatiles by drying after granulation.

References Cited in the file of this patent

UNITED STATES PATENTS

| | | |
|---|---|---|
| 1,966,513 | Moss | July 17, 1934 |
| 2,406,741 | Compton et al. | Sept. 3, 1946 |
| 2,503,866 | Chrysler et al. | Apr. 11, 1950 |
| 2,519,487 | Macek | Aug. 22, 1950 |
| 2,560,621 | Wrenshall | July 17, 1951 |
| 2,877,159 | Lachman et al. | Mar. 10, 1959 |
| 2,933,393 | Ortmann | Apr. 19, 1960 |

FOREIGN PATENTS

| | | |
|---|---|---|
| 134,366 | Australia | Sept. 21, 1949 |

OTHER REFERENCES

USC (United States Dispensatory), pages 428–429 and 443 (extracta and extractum valerianae); 516–517 (hops); 590–592 (milk); 1212–1214 (valerian); 23rd Ed., 1943, Lippincott Co.

Lewis et al.: Food Technol.; volume 7, pages 261–4 (1953).

Bishop: "The Resins of Hops as Antibiotics," pp. 101–104 of "Selective Toxicity and Antibiotics," S.E.B. Symp. No. III, vol. III, 1949.